United States Patent
Maronati et al.

(10) Patent No.: US 10,208,821 B2
(45) Date of Patent: Feb. 19, 2019

(54) DISC BRAKE WITH ENERGIZING RING

(71) Applicant: FRENI BREMBO S.p.A., Curno, Bergamo (IT)

(72) Inventors: Gianluigi Maronati, Bergamo (IT); Leone Oberti, Bergamo (IT)

(73) Assignee: FRENI BREMBO S.p.A., Curno, Bergamo (IT)

( * ) Notice: Subject to any disclaimer, the term of this patent is extended or adjusted under 35 U.S.C. 154(b) by 0 days.

(21) Appl. No.: 15/317,554

(22) PCT Filed: Jun. 10, 2015

(86) PCT No.: PCT/IB2015/054391
§ 371 (c)(1),
(2) Date: Dec. 9, 2016

(87) PCT Pub. No.: WO2015/189785
PCT Pub. Date: Dec. 17, 2015

(65) Prior Publication Data
US 2017/0122390 A1 May 4, 2017

(30) Foreign Application Priority Data

Jun. 11, 2014 (IT) .............................. BG2014A0019

(51) Int. Cl.
*F16D 65/12* (2006.01)
*B60T 8/32* (2006.01)
(Continued)

(52) U.S. Cl.
CPC .............. *F16D 65/12* (2013.01); *B60T 8/329* (2013.01); *F16D 65/123* (2013.01);
(Continued)

(58) Field of Classification Search
CPC ......... F16D 65/12; F16D 65/123; B60T 8/329
(Continued)

(56) References Cited

U.S. PATENT DOCUMENTS 3,469,662 A    9/1969   Dewar
5,067,597 A * 11/1991   Young .................... B60T 8/171
                                                                                              188/181 R
(Continued)

FOREIGN PATENT DOCUMENTS

DE       44 45 236 C1     3/1996
DE       102 37 504 A1     3/2004
(Continued)

OTHER PUBLICATIONS

International Search Report for corresponding International Patent Application No. PCT/IB2015/054391 dated Sep. 7, 2015, 2 pgs.

*Primary Examiner* — Vishal R Sahni
(74) *Attorney, Agent, or Firm* — Merchant & Gould P.C.

(57) ABSTRACT

A disc assembly for a disc brake and energizing ring, or flywheel includes a disc brake disc, a braking band, a bell connecting the brake disc to a vehicle hub; and a connecting portion between the braking band and the bell. An energizing ring includes an energizing ring body having an energizing side, opposite the disc, and coupling side, facing the disc. An energizing ring connecting portion connects cantilevered to the bell to avoid interfering with the braking band and forms an end surface parallel to the radial direction. Projections and/or recesses are provided in the energizing side. A coupling portion cantilevers from the energizing ring body axially and includes a free end portion. The free end portion is received in the energizing ring connecting portion passing through the radial end surface. The energizing ring connecting portion closely surrounds the free end portion, leaving the energizing ring body free.

6 Claims, 9 Drawing Sheets

(51) Int. Cl.
*F16D 66/00* (2006.01)
*G01P 3/487* (2006.01)
*F16D 65/02* (2006.01)

(52) U.S. Cl.
CPC .... *F16D 65/125* (2013.01); *F16D 2065/1316* (2013.01); *F16D 2065/1344* (2013.01); *F16D 2066/003* (2013.01); *G01P 3/487* (2013.01)

(58) Field of Classification Search
USPC .................. 188/218 XL, 18 A, 18 R
See application file for complete search history.

(56) References Cited

U.S. PATENT DOCUMENTS

| | | | |
|---|---|---|---|
| 5,332,065 A | 7/1994 | Steele et al. | |
| 6,568,512 B1 | 5/2003 | Tolani | |
| 6,945,367 B1 * | 9/2005 | Yuhas | B60T 8/329 188/18 R |
| 7,219,778 B2 * | 5/2007 | Pete | B60T 8/329 188/18 A |
| 7,487,862 B2 * | 2/2009 | Carlson | B60T 8/329 188/18 A |
| 7,980,367 B2 * | 7/2011 | Hester | B60T 8/329 188/18 A |
| 8,613,347 B2 * | 12/2013 | Pahle | F16D 65/12 188/17 |
| 2007/0051571 A1 | 3/2007 | Carlson et al. | |
| 2007/0246269 A1 | 10/2007 | Pahle et al. | |
| 2009/0188762 A1 | 7/2009 | Hester | |
| 2011/0272227 A1 | 11/2011 | Burgoon et al. | |

FOREIGN PATENT DOCUMENTS

| | | |
|---|---|---|
| DE | 10237504 | 3/2004 |
| DE | 10 2005 056063 A1 | 5/2007 |
| EP | 0 716 968 A1 | 6/1996 |
| WO | 2006/049851 A1 | 5/2006 |

* cited by examiner

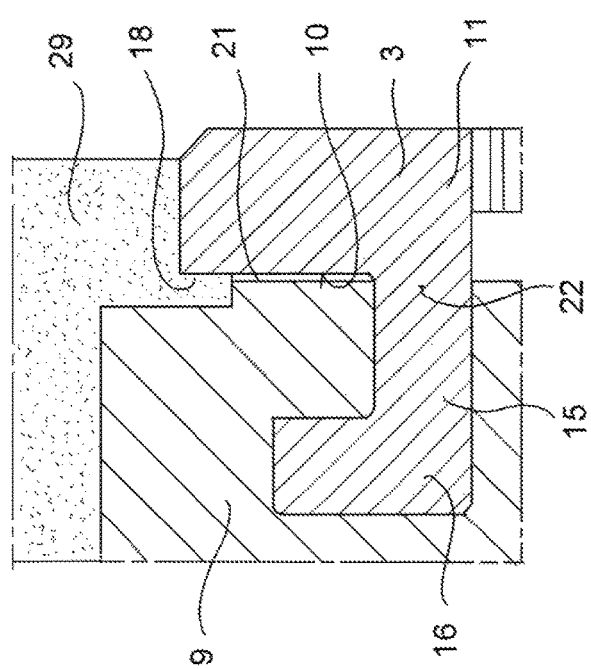
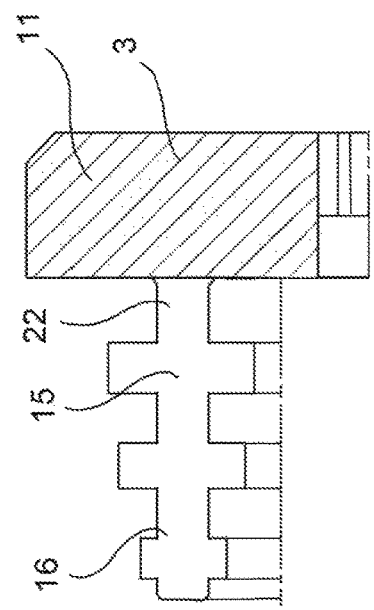
FIG. 8
FIG. 9

DISC BRAKE WITH ENERGIZING RING

This application is a National Stage Application of PCT/IB2015/054391, filed 10 Jun. 2015, which claims benefit of Serial No. BG2014A00001, filed 11 Jun. 2014 in Italy and which applications are incorporated herein by reference. To the extent appropriate, a claim of priority is made to each of the above disclosed applications.

SCOPE OF THE INVENTION

The present invention relates to a disc assembly for a disc brake and energizing ring, or flywheel.

In particular, the present invention relates to an assembly in which the fly wheel is co-melted in the body of the disc for disc brakes.

STATE OF THE ART

As known, anti-lock braking systems in vehicles, including cars, air and rail transport and commercial vehicles have been used for years. The need for such systems is particularly felt in the road haulage industry, especially for articulated vehicles to prevent loss of control, especially of trailers, and to avoid jack-knifing or skidding of the trailer when braking on slippery road surfaces.

Many types of anti-lock braking systems use a detecting and control device of the wheel speed which produces signals representative of the wheel speed which are sent to a logic card of the system.

The logic card calculates the speed of rotation and acceleration or deceleration of the wheel, detecting locking of the wheel and determining imminent slippage and therefore potential danger.

The system further comprises valves modulating the pressure of the fluid of the braking system which, when activated, adjusts the braking.

The logic card modulates the valves based on the relative rotation speed of the wheels to maintain the maximum braking pressure without inducing locking of the wheels.

The most common type of detection device is a magnetic sensor operated by an energizing ring.

The ring is a ring-shaped energizing structure fitted with teeth projecting from a side thereof.

The energizing ring is fitted on an assembly typically comprising a disc brake rotor.

One of the problems that most afflicts these solutions is determined by the corrosion which the disc assembly and energizing ring undergo, corrosion which within a short time determines deterioration of the signal proportional to the wheel speed and thereby malfunction of the anti-lock system.

Additionally, the problem is strongly felt of the stresses present in the brake disc rotors that often lead to the uncoupling of the energizing ring from the rotor, thus the loss of the energizing ring or flywheel and the total loss of signal for the anti-lock system.

These deformations are generated both by the stress suffered by the rotor during braking actions, and by the thermal stresses determined by the braking action which dilates parts of the rotor creating strong tensions and localized deformations.

Over time many solutions have been proposed to these problems without ever reaching a satisfactory result.

For example, from the document U.S. Pat. No. 3,469,662 of DUNLOP RUBBER CO. it is known of to create a flywheel from a portion of the brake disc rotor. This solution, while obviously solving the problem of the loss of the energizing ring, being in one piece with the rotor, suffers greatly from both mechanical and thermal solicitations induced thereon as well as from corrosion which attacks the rotor even if coated with paint which does not always prove effective and above all durable.

From the documents WO2006049851 of GUNITE CORP, US2011272227 of PERFORMANCE FRICTION, US2009188762 of HESTER LARRY B, US2007246269 of KNORR-BREMSE SYSTEME FÜER and US2007051571 of CARLSON BRADLEY S it is also known of to make an energizing ring in a different material from the rotor and applied thereto, for example with snap-coupling or screwed. This known solution, while solving the problem of corrosion suffers heavily instead from the deformations induced on the rotor by mechanical or thermal stresses, which can also easily lead to the separation of the ring from the rotor.

From the documents U.S. Pat. No. 6,568,512 of INT TRUCK INTELLECTUAL PROP CO., U.S. Pat. No. 5,332,065 of BUDD CO., U.S. Pat. No. 5,067,597 of YOUNG WARREN J and EP0716968 1994 of BUDERUS GUSS GMBH it is known of to make an energizing ring partially co-melted with the brake disc rotor.

All these solutions for solving the corrosion problem by proposing an energizing ring in a different material from the rotor and a coupling between ring and rotor by comelting, thus a secure coupling, do not propose any solution for preventing mechanical or thermal stresses of the disc from affecting the arrangement of the measuring surfaces of the energizing ring, causing serious problems in the case of deformation of the rotor.

The need thus remains strongly felt to propose a solution that simultaneously solves three conflicting problems:
- corrosion of the energizing ring
- the stable and secure coupling of the energizing ring and the rotor
- the separation of the rotor deformations caused by mechanical or thermal stresses from the exact position of the energizing ring.

SOLUTION

The purpose of the present invention is therefore to propose a disc assembly and energizing ring which makes it possible to achieve the above mentioned requirements, as well as to solve the problems of prior art mentioned.

Some advantageous embodiments are described in the dependent claims.

DRAWINGS

Further characteristics and advantages of the assembly according to the invention will, in any case, be evident from the description given below of its preferred embodiments, made by way of a non-limiting example with reference to the appended drawings, wherein:

FIG. 8 is a local cross-section of a detail of the energizing ring housed with a portion thereof in the connecting portion of the disc, leaving an undercut support surface to support the moulding core or the mould in the casting step of the disc;

FIG. 9 is a local cross-section of an energizing ring according to a further embodiment;

Figure 1:
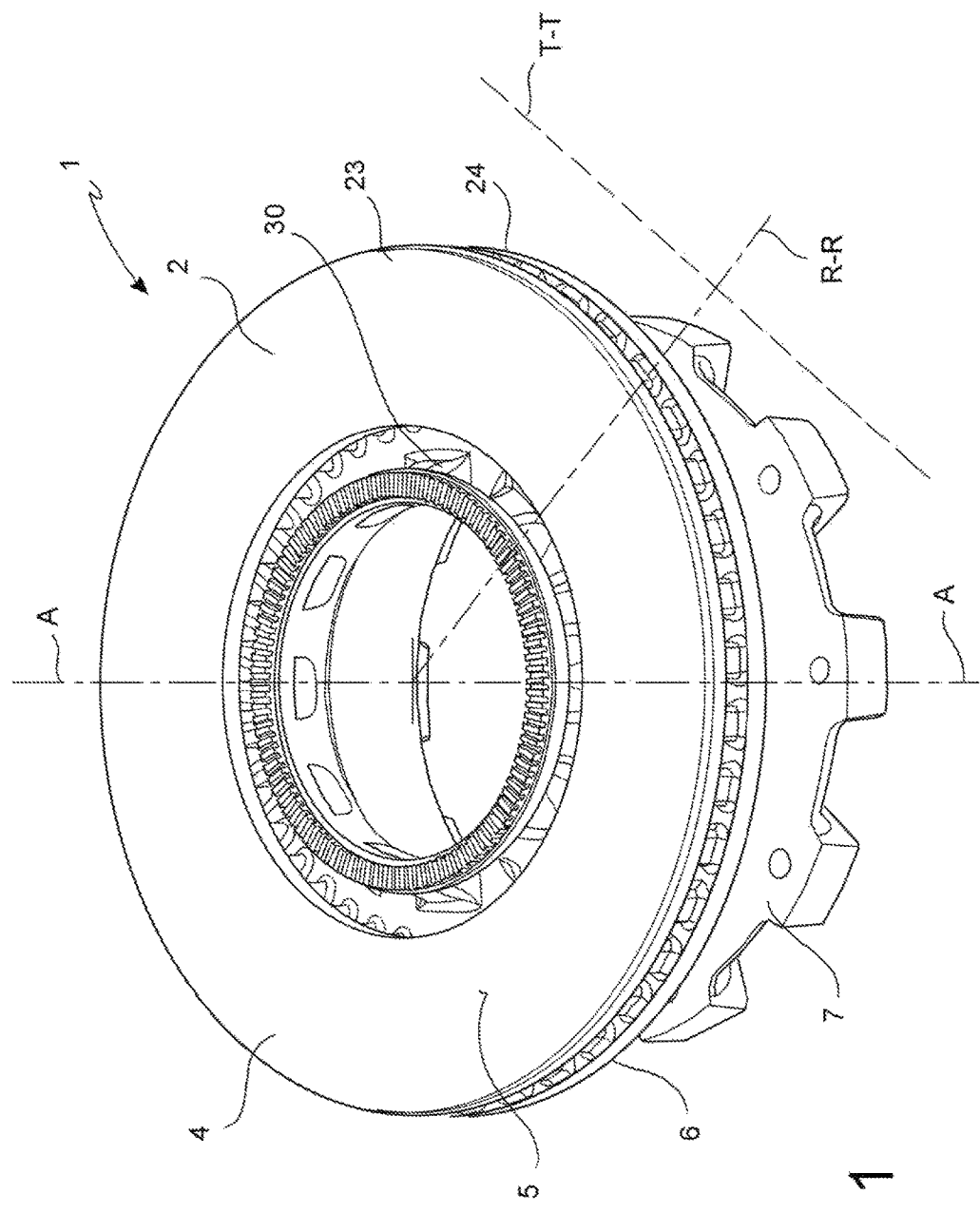
FIG. 1 is an axonometric view of a disc assembly for a disc brake and energizing ring.
Figure 2:
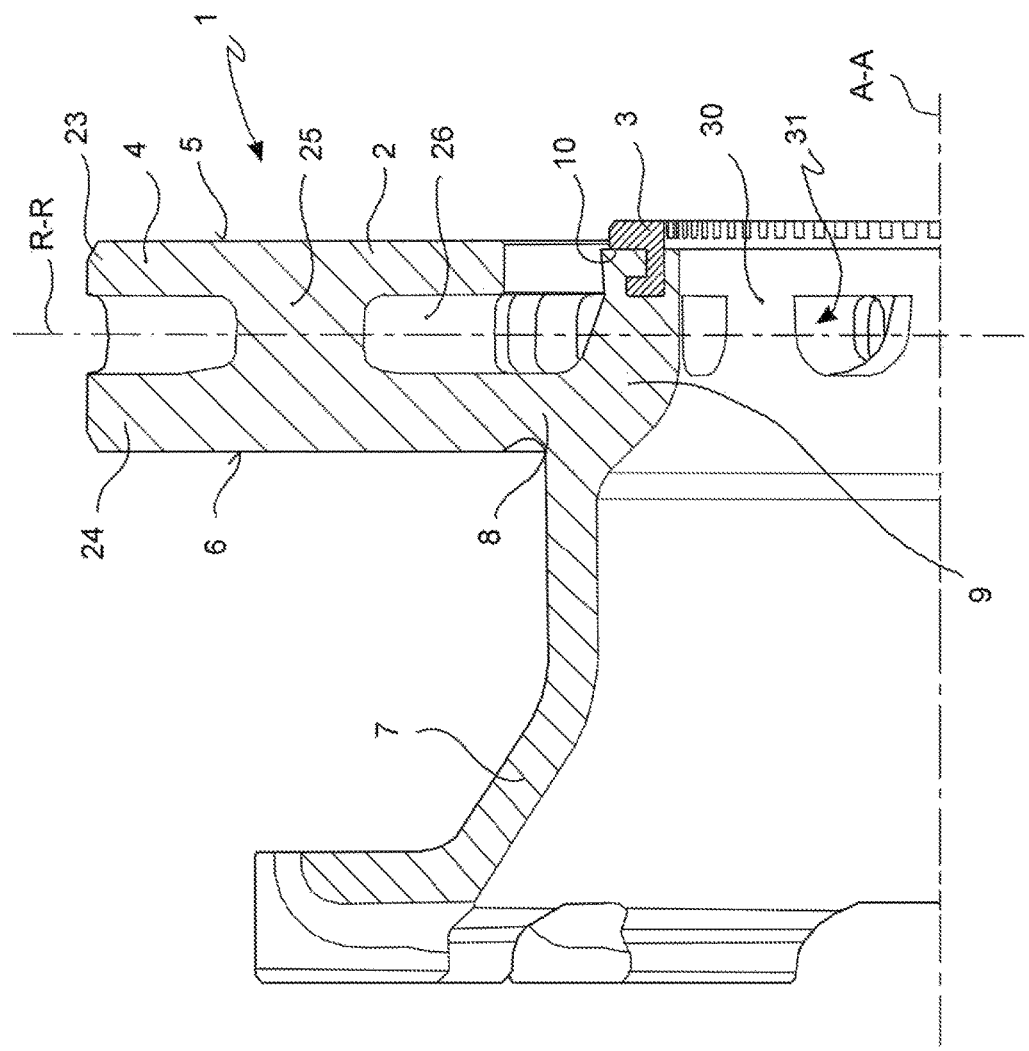
FIG. 2 shows in transversal cross-section along an axis directed axially, a detail of FIG. 1, which shows how a portion of the energizing ring is buried in the material of a connecting portion of the disc.
Figure 4:
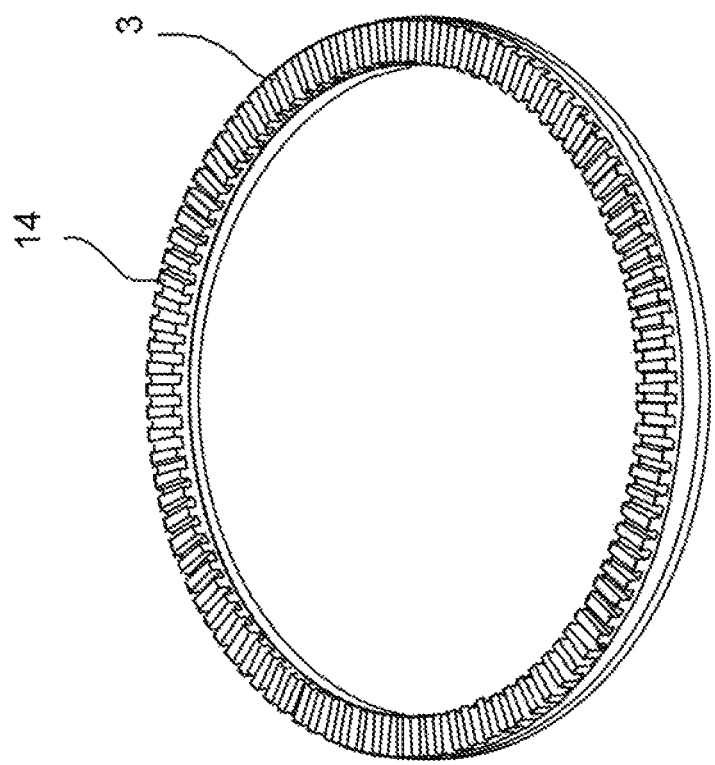
FIG. 4 shows in axonometric view an energizing ring with an annular coupling portion.
Figure 3:
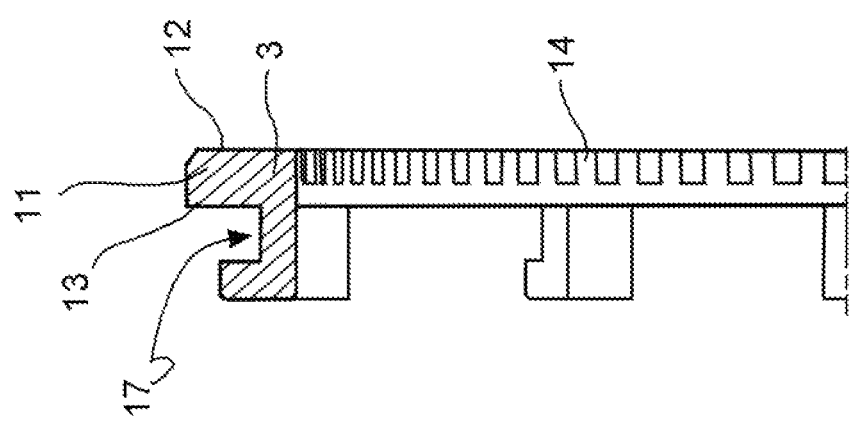
FIG. 3 shows a detail in cross-section of an energizing ring with coupling portion to a plurality of axial feet.
Figure 5:
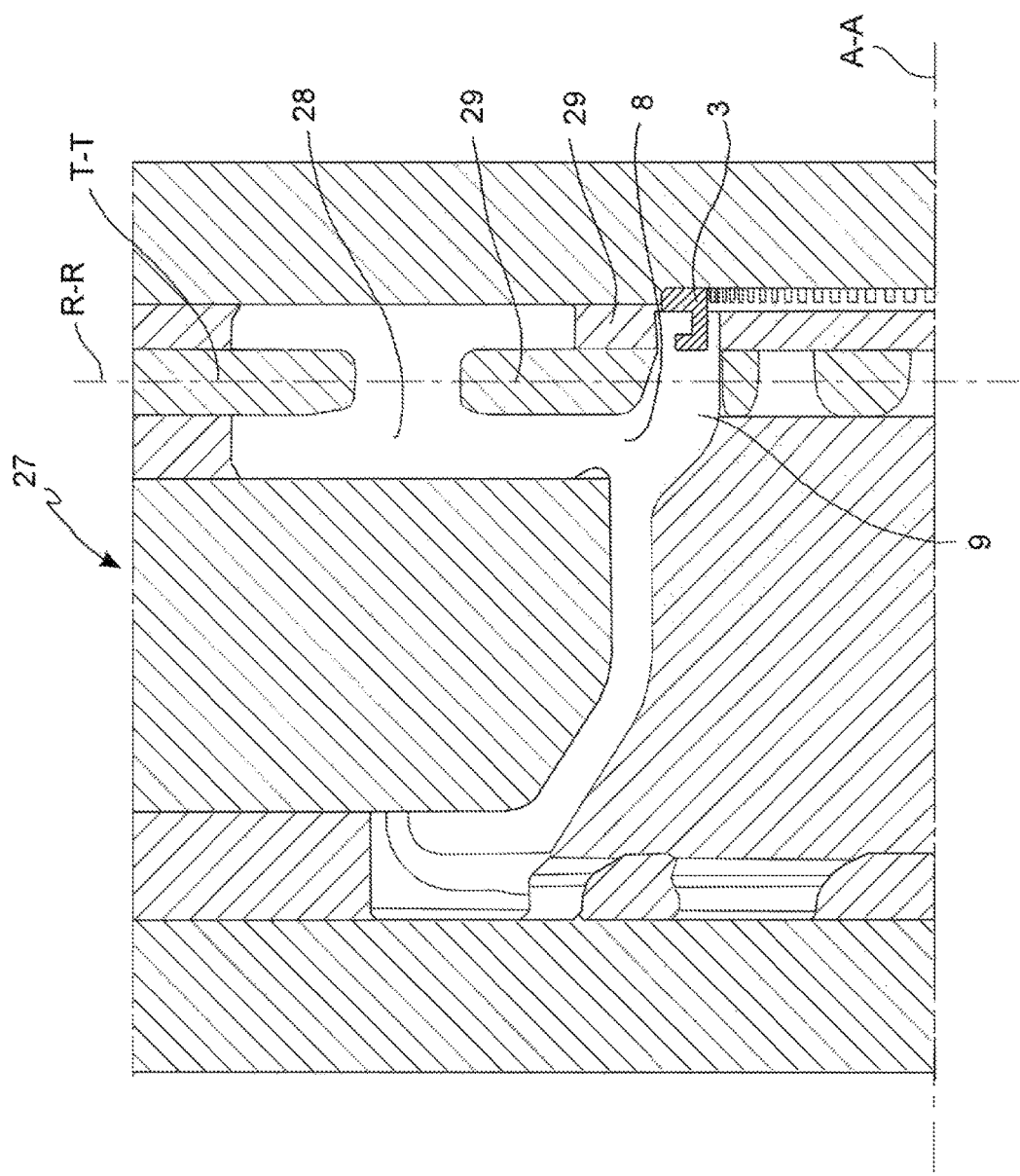
FIG. 5 shows in cross-section a detail of an energizing ring housed as an insert in a multiple part mould and forming a cavity suitable to make a disc brake disc.
Figure 6:
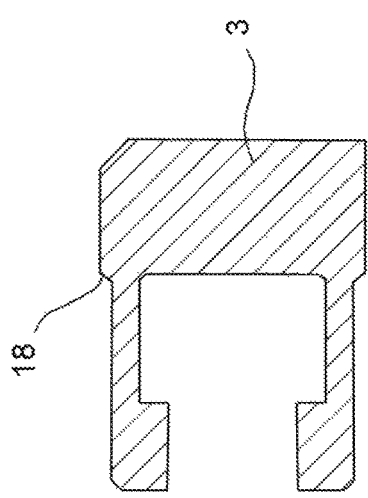
FIG. 6 is a local cross-section of an energizing ring according to a further embodiment.
Figure 7:
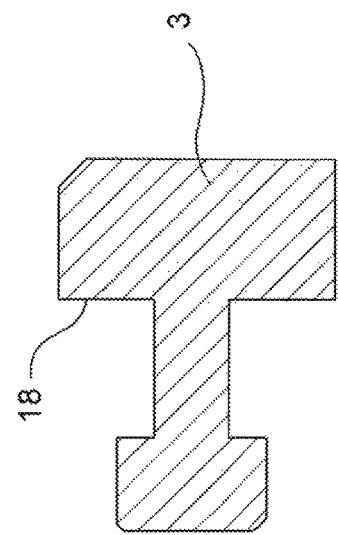
FIG. 7 is a local cross-section of an energizing ring according to a further embodiment.
Figure 10:
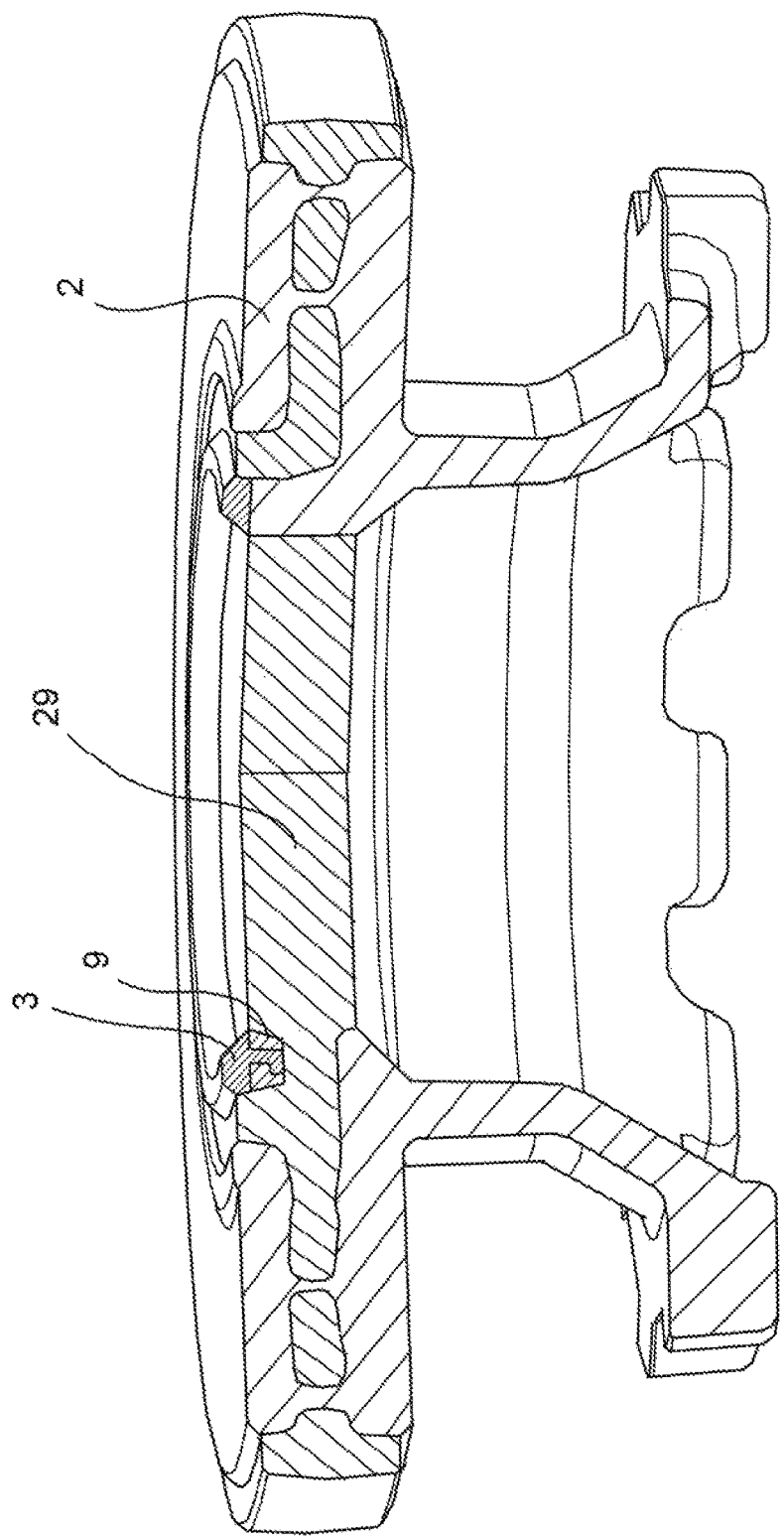
FIG. 10 shows an axonometric view partially in axial cross-section of an unfinished disc still joined to the foundry core and to the energizing ring, from which it can be seen how the ring, in this embodiment, is supported by its conical surfaces which rest on conical surfaces of the foundry core.
Figure 10A:
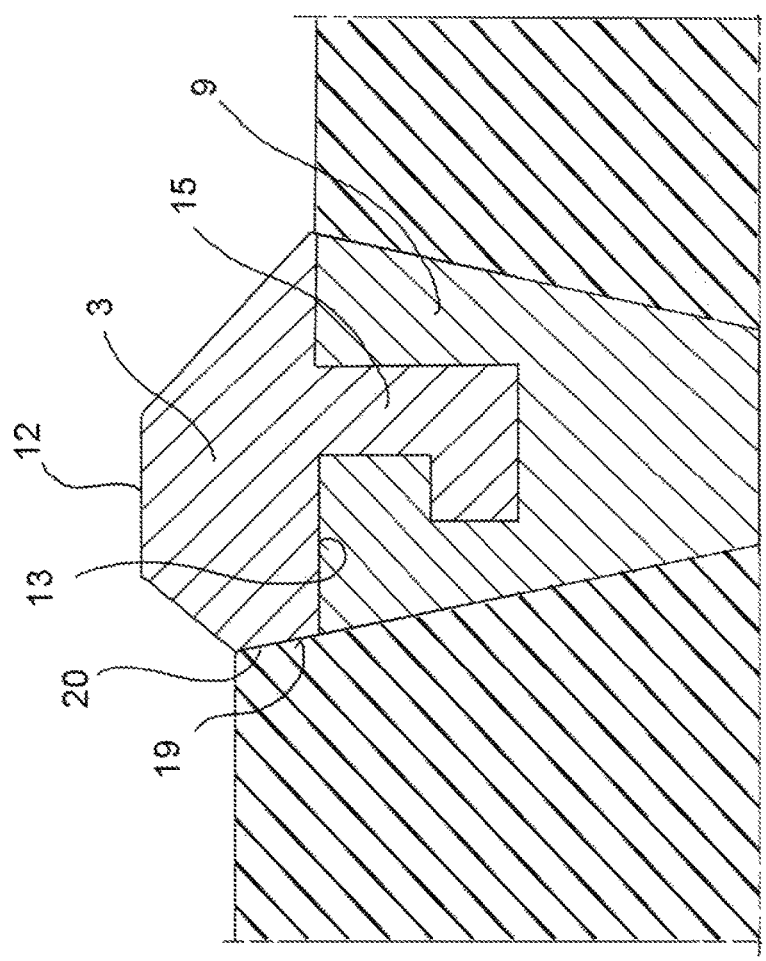
Figure 11:
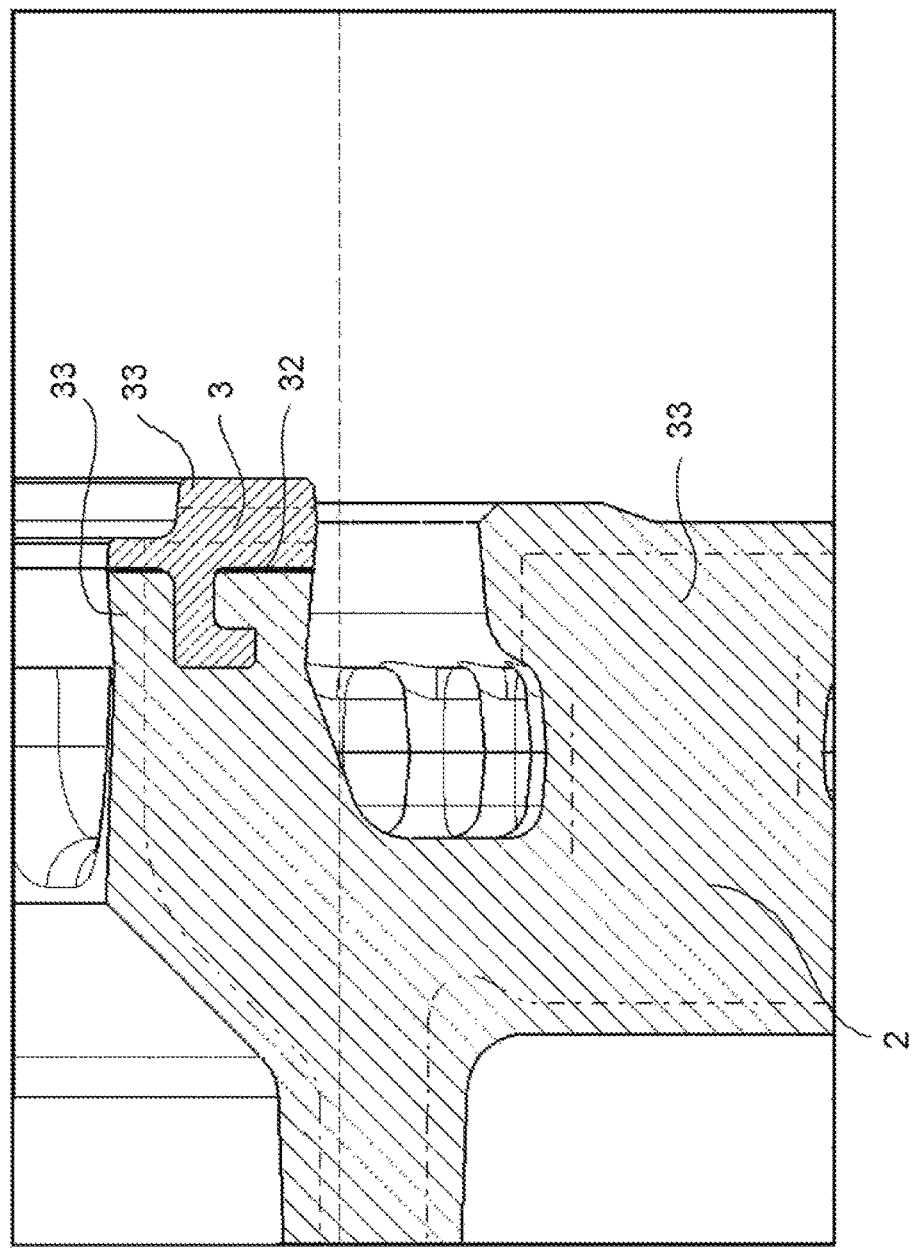

FIG. 10A is a local cross-section of a detail of the energizing ring buried with a part thereof in the connecting portion of the disc and laid with its conical side surface on the foundry core FIG. 11 shows a detail of an axial cross-section of a disc assembly and energizing ring just extracted from the mould and showing the allowance that must be removed for machining to bring the functional surfaces to nominal size and correct operating tolerances after the cast has cooled and stabilised.

DESCRIPTION OF SOME PREFERRED EMBODIMENTS

With reference to the above figures and according to a general embodiment, a disc assembly 1 for disc brake and energizing ring, or flywheel, comprises a disc for disc brake 2 which develops about a rotation axis defining an axial direction A-A, a radial direction R-R, orthogonal to said axial direction A-A, and a tangential or circumferential direction T-T perpendicular to said axial direction A-A and said radial direction R-R.

According to one embodiment, said disc is made with a first, less corrosion-resistant material, such as laminated iron, but suitable to withstand thermal stress.

Said disc 2 comprises a braking band 4 adapted to cooperate with opposite braking surfaces 5, 6 thereof with a brake caliper or calliper.

Said disc 2 further comprises a bell 7 for connecting the brake disc 2 to a hub of a vehicle Said disc 2 comprises a connecting portion 8 between said braking band 4 and said bell 7.

Said disc 2 further comprises a connecting portion 9 of an energizing ring connected cantilevered to said bell 7 so as to avoid interfering with said braking band 4 and forming an end surface 10 arranged parallel to the radial direction R-R.

According to one embodiment, said connecting portion 9 is cantilevered axially A-A.

According to one embodiment, said connecting portion 9 is connected to the bell 7 by means of mechanical decoupling bridges or spokes 30 between the connecting portion 9 and band 4, the spokes 30 between them forming large ventilation and thermal decoupling windows 31.

Said assembly further comprising an energizing ring 3. Said ring 3 comprises an energizing ring body 11 having an energizing side 12, opposite said disc 2, and a coupling side 13, facing said disc 2.

Said energizing ring 3 comprises a plurality of projections and/or recesses 14 provided in said energizing side 12.

According to one embodiment, said projections or recesses are a plurality of equi-spaced projections or recesses and circumferentially distributed along said energizing side 12 of an annular shape. According to one embodiment, said projections or recesses 14 project in an axial direction A-A.

According to one embodiment, said energizing ring 3 is in a second, more corrosion-resistant material than said first disc material 2, such as steel, particularly stainless steel.

According to one embodiment, at least a coupling portion cantilevers from said energizing ring body 11 in an axial direction A-A and includes a free end portion 16.

According to one embodiment, said coupling portion 15 is a plurality of axially projecting feet.

According to one embodiment, said coupling portion 15 is an annular axial extension.

According to one embodiment, said free end portion 16 of the coupling portion 15 is received or buried in said connecting portion 9 of an energizing ring of the disc 2 passing through said radial end surface 10.

According to one embodiment, said connecting portion 9 of an energizing ring closely surrounds said free end portion 16 of the coupling portion 15, leaving said energizing ring body 11 free, substantially cantilevered, creating a mechanical and thermal decoupling, while maintaining a firm anchorage to the disc.

According to one embodiment, said free end portion 16 of the coupling portion 15 includes undercut portions 17 closely surrounded by the material of the connecting portion 9 of an energizing ring of the disc 2 forming a close, non-detachable geometric mating.

According to one embodiment, said energizing ring body 11 comprises at least a core support portion 18 which cantilevers radially outwardly from the radial footprint of said radial end surface 10 of the connecting portion of an energizing ring 9 (FIG. 8).

According to one embodiment, a radially outer side 19 of the energizing ring body 11 comprises at least one conical stretch which tapers in the axial direction A-A passing from said energizing side 12 to said coupling side 13 (FIG. 10A).

According to one embodiment, between said energizing ring body 11 and said radial end surface 10 of said connecting portion 9 of an energizing ring of the disc 2 there is a clearance 21 with the exception of the stretch forming said coupling portion 15.

According to one embodiment, said coupling portion 15 comprises a neck stretch 22 connected to said energizing ring body 11 which continues in a free end portion 16.

According to one embodiment, said energizing ring body 11 and said radial end surface 10 of said connecting portion 9 of an energizing ring are reciprocally spaced apart by aclearance 21 and are connected to each other only by said neck 22 of the coupling portion 15, leaving said body 11 cantilevered (FIG. 8).

According to one embodiment, said braking band 4 and said bell 7 are in one piece.

According to one embodiment, said braking band is of cast iron, for example laminar cast iron or flake graphite cast iron, and said energizing ring 3 is made of steel, such as stainless steel.

According to one embodiment, said braking band 4 is of cast iron, for example laminar cast iron or flake graphite cast iron, said bell 7 is of aluminium and said energizing ring 3 is made of steel, such as stainless steel.

According to one embodiment, said disc 2 is obtained by comelting or co-melting, incorporating said free end portion 16 of said energizing ring 3.

According to one embodiment, said bell 7 is obtained by comelting, connecting itself to said braking band 4 via said connecting portion 8 between said braking band and said bell and incorporating said free end portion 16 of said energizing ring 3.

According to one embodiment, said braking band 4 is a single hub braking band.

According to one embodiment, said braking band 4 is a ventilated braking band comprising two plates or hubs 23, 24 connected together by connecting elements 25 forming a radial ventilation conduit 26 for the cooling of the braking band 4.

A method of realization of the assembly described above will be described below.

Method of production of a disc assembly 1 for disc brake and energizing ring, comprising the steps of:

providing an energizing ring 3 comprising an energizing ring body 11 having an energizing side 12 and an opposite coupling side 13 and having a plurality of projections and/or recesses 14 provided in said energizing side 12, as well as at least one coupling portion 15 which cantilevers from said energizing ring body 11 in the axial direction A-A, comprising a free end portion 16;

Said method comprises, according to a possible procedure, the further step in which said energizing ring 3 is in hot-melting material and in a more corrosion-resistant material.

Said method comprises, according to a possible procedure, the further step in which a mould 27 is provided having a cavity 28 of suitable shape to form a disc for disc brake 2 which develops about a rotation axis defining an axial direction A-A, a radial direction R-R, orthogonal to said axial direction A-A, and a tangential or circumferential direction T-T orthogonal to said axial direction A-A and said radial direction R-R; and a braking band 4 adapted to cooperate with opposite braking surfaces 5, 6 thereof with a brake caliper; as well as a bell 7 for connecting the brake disc 2 to a hub of a vehicle; said cavity being of suitable shape to form a connecting portion 8 between said braking band 4 and said bell 7 and a connecting portion 9 of an energizing ring connected cantilevered to said bell 7 so as not to interfere with said brakingband 4 and forming an end surface 10 arranged parallel to the radial direction R-R.

Said method comprises, according to a possible procedure, the further step in which said free end portion 16 of said energizing ring 3 is inserted in said cavity 28 so that said free end 16 can receive around itself and closely in contact low-melting material melted in said cavity 28, low-melting material or material melting at a lower temperature than said hot-melting material of the energizing ring 3.

Said method comprises according to a possible procedure, the further step in which low-melting material less resistant to corrosion than said material of the energizing ring is cast in said cavity 28 forming said disc 2 and incorporating and burying said free end 16 in said connecting portion 9 of an energizing ring.

Said method, according to a possible procedure, alternatively provides that said step of providing an energizing ring 3 provides for leaving allowance for machining 33 on said ring.

Said method, according to a possible procedure, alternatively provides, following the formation of the disc 2 and following the extraction of the formed disc from the mould 27, for the processing of the energizing ring 3 and in particular of the energizing side 12 for perfectly forming in the desired size and tolerances said plurality of projections and/or recesses 14, for example, by chip removal processing.

Said method, according to a possible procedure, alternatively provides that said cavity of said mould is made so as to form a disc of a disc brake 2 with an allowance for machining 33.

Said method, according to a possible procedure, alternatively provides, following the formation of the disc 2 and following the extraction of the formed disc from the mould 27, for the processing of the disc, for example the braking band and the coupling surfaces of the disc and/or the bell to the hub, for example by chip removal processing so as to bring said surfaces to the desired size and tolerances.

Said method, according to a possible procedure, alternatively provides that said energizing ring 3 is supported by a foundry core 29 adapted to be inserted into said mould and to form the undercuts of the disc for disc brake 2.

Said method, according to a possible procedure, alternatively provides that said core 29 has a support surface 30 for said energizing ring whereon said energizing ring 3 is arranged and said energizing ring 3 is supported with said free end portion 16 thereof that cantilevers into said cavity 28 to be buried in the low-melting material of the disc 2.

Said method, according to a possible procedure, alternatively provides that before inserting said energizing ring 3 partially in said cavity 28, said coupling side 13 is covered with a suitable material to prevent the close contact of the low-melting material of the disc with said energizing ring body 11, for example with a layer of graphite 32.

Said method, according to a possible procedure, alternatively provides that, following the formation of the disc 2 and following the extraction of the formed disc from the mould 27, the graphite 32 is removed, for example by vibration, forming a clearance 21 between said coupling side 13 and said radial end surface 10 of said connecting portion 9 of an energizing ring.

Said method, according to a possible procedure, alternatively provides that said body 11 of said energizing ring 3 is left cantilevered with respect to said radial end surface 10 of said connecting portion 9 of an energizing ring.

Advantageously, the present invention also relates to a vehicle, such as a commercial vehicle, comprising an assembly according to any of the above-described embodiments.

Thanks to the features described above provided for separately or in combination with each other in particular embodiments, it is possible to obtain an assembly that at the same time satisfies the conflicting aims above and in particular:

a high corrosion resistance of the energizing ring;

a firm and secure constraint between the energizing ring and rotor;

the separation between the rotor deformations caused by mechanical and/or thermal stresses and the exact location of the energizing ring.

A person skilled in the art may make numerous modifications and variations to the assembly according to the invention so as to satisfy contingent and specific requirements while remaining within the sphere of protection of the invention as defined by the following claims.

REFERENCES

1 assembly
2 disc for disc brake 3 energizing ring or flywheel
4 braking band
5 braking surfaces
6 braking surfaces
7 bell
8 connecting portion between said braking band and said bell
9 connecting portion of an energizing ring
10 radial end surface
11 energizing ring body
12 energizing side
13 coupling side
14 plurality of projections and/or recesses
15 coupling portion
16 free end portion
17 undercut portions
18 core support portion
19 radially outer side
20 conical stretch
21 clearance
22 neck stretch
23 two plates
24 two plates
25 connecting elements
26 radial ventilation conduit
27 mould
28 cavity
29 foundry core
30 spokes
31 windows
32 graphite
33 allowance for machining

The invention claimed is:

1. A disc brake and energizing ring assembly, comprising:
a disc for a disc brake arranged about a rotation axis defining an axial direction, a radial direction orthogonal to said axial direction, and a tangential or circumferential direction perpendicular to said axial direction and said radial direction;
said disc composed of a first material and comprising:
a braking band adapted to cooperate with opposite braking surfaces thereof with a brake caliper;
a bell connecting the brake disc to a hub of a vehicle;
a first connecting portion between said braking band and said bell;
a second connecting portion connected cantilevered to said bell to avoid interference with said braking band and forming an end surface arranged parallel to the radial direction;
the energizing ring comprising:
an energizing ring body having an energizing side, opposite to said disc, and coupling side, facing said disc;
a plurality of projections and/or recesses provided in said energizing side;
a second material more resistant to corrosion than the first material;
wherein at least a coupling portion cantilevers from said energizing ring body in the axial direction and includes a free end portion;
said free end portion of the coupling portion is received in said second connecting portion passing through said radial end surface;
said second connecting portion surrounding said free end portion of the coupling portion, and extending intermediate said energizing ring body and said free end portion of the coupling portion;
said free end portion of the coupling portion includes undercut portions closely surrounded by the second material of the second connecting portion of the disc forming a non-detachable geometric mating.

2. Assembly according to claim 1, wherein said energizing ring body comprises at least a core support portion which cantilevers radially outwardly from the radial footprint of said radial end surface of the second connecting portion.

3. Assembly according to claim 1, wherein
a radially outer side of the energizing ring body comprises at least one conical stretch which tapers in the axial direction passing from said energizing side to said coupling side.

4. Assembly according to claim 1, wherein between said energizing ring body and said radial end surface of said second connecting portion is located a clearance with the exception of the stretch forming said coupling portion; and/or wherein
said coupling portion comprises a neck stretch connected to said energizing ring body which continues in a free end portion and wherein
said energizing ring body and said radial end surface of said second connecting portion are reciprocally spaced apart by a clearance and are connected to each other only by said neck of coupling portion.

5. Assembly according to claim 1, wherein
said braking band and said bell are in one piece; and/or wherein
said braking band is laminar cast iron or flake graphite cast iron, and said energizing ring is made of stainless steel; and/or wherein
said braking band is laminar cast iron or flake graphite cast iron, said bell is aluminum and said energizing ring is made of stainless steel; and/or wherein
said disc is obtained by comelting incorporating said free end portion of said energizing ring; and/or wherein
said bell is obtained by comelting connecting to said braking band via said first connecting portion and incorporating said free end portion of said energizing ring; and/or wherein
said braking band is a single hub braking band; and/or wherein
said braking band is a ventilated braking band comprising two plates or hubs connected together by connecting elements forming a radial ventilation conduit for the cooling of the braking band.

6. Vehicle comprising an assembly according to claim 1.

* * * * *